United States Patent
Cumpston et al.

(10) Patent No.: US 6,322,931 B1
(45) Date of Patent: *Nov. 27, 2001

(54) METHOD AND APPARATUS FOR OPTICAL DATA STORAGE USING NON-LINEAR HEATING BY EXCITED STATE ABSORPTION FOR THE ALTERATION OF PRE-FORMATTED HOLOGRAPHIC GRATINGS

(75) Inventors: Brian H. Cumpston, Sunnyvale, CA (US); Joseph W. Perry; Seth R. Marder, both of Tucson, AZ (US)

(73) Assignee: Siros Technologies, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/364,271

(22) Filed: Jul. 29, 1999

(51) Int. Cl.[7] .................. G03H 1/12; G11B 7/00
(52) U.S. Cl. .................. 430/1; 430/2; 430/281.1; 430/280.1; 369/103
(58) Field of Search ............... 430/280.1, 281.1, 430/945, 1, 2

(56) References Cited

U.S. PATENT DOCUMENTS

| | | | |
|---|---|---|---|
| 3,618,049 | 11/1971 | Amodei et al. | 340/173 |
| 3,632,869 | 1/1972 | Bartollini et al. | 178/6.8 |

(List continued on next page.)

FOREIGN PATENT DOCUMENTS 42 08 328 A 1    9/1993 (DE) .................. G11B/7/00

(List continued on next page.)

OTHER PUBLICATIONS

He, Guang, et al., "Two–photon absorption based optical limiting and stabilization in organic molecule doped soild materials", Opt. Commun., vol. 117(1,2) pp. 133–136, May 1995.*

(List continued on next page.)

*Primary Examiner*—Martin Angebranndt
(74) *Attorney, Agent, or Firm*—Sierra Patent Group, Ltd.; Andrew V. Smith

(57) ABSTRACT

The present invention comprises an optical data storage system utilizing a host material and molecules that exhibit non-linear absorption dissolved therein. The non-linear absorbing molecules allow for energy in the form of heat to be generated during the optical data storage process. This heat provides for localized alterations to occur in the pre-formatted holographic grating. The non-linear feature of these molecules allow for alterations to occur at specific depths and locations within the storage medium while limiting the secondary effects on other locations within the storage medium. The molecules exhibiting non-linear absorption may be selected from the group of molecules exhibiting two-photon absorption or reverse saturable absorption. The invention also comprises a method for preparing the optical storage medium, an optical data storage device comprising the optical data storage medium and having a format hologram stored within the medium. Additionally, the invention comprises an optical data storage system and method for use thereof wherein the storage system uses the optical data storage medium described above when altering a pre-formatted holographic grating in a localized region by non-linear thermal disruption of the grating. Another embodiment of the present invention comprises an optical data retrieval system embodying the optical data storage device described above and a method for retrieving the format hologram stored on the optical data storage device of the present invention.

10 Claims, 10 Drawing Sheets

U.S. PATENT DOCUMENTS

| | | | |
|---|---|---|---|
| 3,635,545 | 1/1972 | van Kerkhove et al. | 350/163 |
| 3,704,929 | 12/1972 | Sakaguchi et al. | 350/3.5 |
| 3,720,921 | 3/1973 | Schools et al. | 340/13 |
| 3,860,950 | 1/1975 | Wick et al. | 358/2 |
| 3,903,360 | 9/1975 | Kamisaka et al. | 178/6.7 A |
| 3,936,140 | 2/1976 | Ruell | 350/3.5 |
| 3,947,640 | 3/1976 | Ruell et al. | 179/100.3 B |
| 4,024,513 | 5/1977 | Huignard et al. | 340/173 |
| 4,026,705 * | 5/1977 | Crivello et al. | 430/280.1 |
| 4,034,355 | 7/1977 | Carlsen | 340/173 |
| 4,045,115 | 8/1977 | Lee | 350/3.5 |
| 4,058,401 | 11/1977 | Crivello | 96/115 R |
| 4,138,189 | 2/1979 | Huignard et al. | 350/3.64 |
| 4,183,094 | 1/1980 | Keezer et al. | 365/127 |
| 4,187,111 | 2/1980 | Chandross et al. | 430/2 |
| 4,250,053 * | 2/1981 | Smith | 430/280.1 |
| 4,318,581 | 3/1982 | Guest et al. | 350/3.74 |
| 4,458,345 | 7/1984 | Bjorklund et al. | 369/103 |
| 4,467,462 | 8/1984 | Shibata | 369/45 |
| 4,775,968 | 10/1988 | Ohsato | 369/46 |
| 4,859,548 | 8/1989 | Heise et al. | 430/1 |
| 4,920,220 | 4/1990 | Phaff | 544/90 |
| 4,924,455 | 5/1990 | Fujiie et al. | 369/44.21 |
| 4,999,234 | 3/1991 | Cowan | 428/156 |
| 5,157,555 | 10/1992 | Reno | 359/823 |
| 5,161,039 | 11/1992 | Schellenberg | 359/3 |
| 5,191,574 | 3/1993 | Henshaw et al. | 369/100 |
| 5,202,875 | 4/1993 | Rosen et al. | 369/94 |
| 5,242,715 | 9/1993 | Schoen et al. | 427/396 |
| 5,243,589 | 9/1993 | Stuke et al. | 369/100 |
| 5,263,011 | 11/1993 | Maeda et al. | 369/44.27 |
| 5,283,777 | 2/1994 | Tanno et al. | 369/108 |
| 5,289,407 | 2/1994 | Strickler et al. | 365/106 |
| 5,331,445 | 7/1994 | Dickson et al. | 359/15 |
| 5,361,238 | 11/1994 | Owechko | 365/234 |
| 5,408,453 | 4/1995 | Holtslag et al. | 369/44.23 |
| 5,415,835 | 5/1995 | Brueck et al. | 430/311 |
| 5,422,873 | 6/1995 | Kewitsch et al. | 369/103 |
| 5,430,701 | 7/1995 | Ito et al. | 369/44.41 |
| 5,440,669 | 8/1995 | Rakuljic et al. | 359/7 |
| 5,450,218 | 9/1995 | Heanue et al. | 359/21 |
| 5,453,340 * | 9/1995 | Kawabata et al. | 430/1 |
| 5,477,347 | 12/1995 | Redfield | 369/3 |
| 5,479,394 | 12/1995 | Yashima et al. | 369/275.1 |
| 5,499,231 | 3/1996 | Fennema et al. | 369/124 |
| 5,513,158 | 4/1996 | Ohsato | 369/44.23 |
| 5,526,336 | 6/1996 | Park et al. | 369/94 |
| 5,529,861 | 6/1996 | Redfield | 430/1 |
| 5,547,748 | 8/1996 | Ruoff et al. | 428/323 |
| 5,559,773 | 9/1996 | Kentatsu et al. | 369/44.42 |
| 5,566,387 | 10/1996 | Dewald | 369/103 |
| 5,590,110 | 12/1996 | Sato | 369/100 |
| 5,610,895 | 3/1997 | Izumi et al. | 369/112 |
| 5,627,814 | 5/1997 | Lee | 369/116 |
| 5,636,190 | 6/1997 | Choi | 369/44.23 |
| 5,639,579 | 6/1997 | Hayashi et al. | 430/7 |
| 5,659,536 | 8/1997 | Maillot et al. | 369/275.1 |
| 5,671,207 | 9/1997 | Park | 369/112 |
| 5,682,372 | 10/1997 | Yamakawa et al. | 369/94 |
| 5,691,971 | 11/1997 | Kim | 369/112 |
| 5,696,743 | 12/1997 | Kawasaki et al. | 369/32 |
| 5,698,345 * | 12/1997 | Ohe et al. | 430/1 |
| 5,701,288 | 12/1997 | Seong | 369/112 |
| 5,702,846 | 12/1997 | Sato et al. | 430/2 |
| 5,712,730 | 1/1998 | Zarschitzky et al. | 359/569 |
| 5,729,522 | 3/1998 | Akama et al. | 369/112 |
| 5,737,294 | 4/1998 | Yamakawa et al. | 369/99 |
| 5,737,295 | 4/1998 | Lee | 369/103 |
| 5,740,136 | 4/1998 | Tsutsui et al. | 369/44.25 |
| 5,748,597 | 5/1998 | Kim | 369/94 |
| 5,754,512 | 5/1998 | Komma et al. | 369/112 |
| 5,757,744 | 5/1998 | Akkermans | 369/44.25 |
| 5,759,721 * | 6/1998 | Dhal et al. | 430/1 |
| 5,761,111 | 6/1998 | Glezer | 365/106 |
| 5,764,606 | 6/1998 | Fukumoto et al. | 369/44.41 |
| 5,768,242 | 6/1998 | Juday | 369/103 |
| 5,776,634 * | 7/1998 | Ohkuma et al. | 430/1 |
| 5,786,117 | 7/1998 | Hoshi et al. | 430/21 |
| 5,790,493 | 8/1998 | Takeya et al. | 369/58 |
| 5,793,720 | 8/1998 | Nishikata | 369/44.25 |
| 5,793,721 | 8/1998 | Akkermans | 369/44.27 |
| 5,811,789 | 9/1998 | Nix | 250/201.2 |
| 5,822,090 | 10/1998 | Wilde | 359/7 |
| 5,891,656 * | 4/1999 | Zarling et al. | 435/792 |
| 5,966,361 | 10/1999 | Stoll | 369/103 |
| 5,982,513 | 11/1999 | Zhou et al. | 359/22 |
| 6,020,985 | 2/2000 | McLeod et al. | 369/22 |
| 6,045,888 * | 4/2000 | Chen et al. | 430/270.14 |
| 6,111,828 | 8/2000 | McLeod et al. | 369/44.23 |
| 6,212,148 * | 4/2001 | Hesselink et al. | 369/103 |

FOREIGN PATENT DOCUMENTS

| | | | |
|---|---|---|---|
| 195 34 501 A1 | 5/1996 | (DE) | G11B/7/007 |
| 03-068949 * | 3/1991 | (JP) | . |
| 410102766A | 5/1998 | (JP) | C08G/59/68 |
| 07005796A | 2/1994 | (JP) | G03H/1/02 |
| WO 97/13183 | 4/1997 | (WO) | G03F/7/00 |
| WO 99/26112 | 5/1999 | (WO) | G03F/7/00 |
| WO 97/44714 | 11/1997 | (WO) | G03H/1/02 |
| WO 99/39248 | 8/1999 | (WO) | G03H/1/12 |

OTHER PUBLICATIONS

Fleisher et al., "An Optically Accessed Memory Using the Lippmann Process for Information Storage," *Optical and Electro–Optical Information Processing*, 1965, Chapter 1, MIT Press, pp. 11–40.

Serdyuk et al., "Structure of Wave Fields Formed by 3–D Vector Holograms," *Opt. Spectrosc (USSR)*, vol. 57, No. 4, Oct. 1984, pp. 415–419.

Perry et al., "Enhanced Reverse Saturable Absorption and Optical Limiting in Heavy–Atom Substitued Phthalocyanines" a reprint from *Optics Letters, Jet Propulsion Laboratory, California Insititute of Technology*, May 1, 1994, vol. 19, No. 9, pp. 625–627.

Homan et al., "High–Capacity Optical Storage Using Multiple Wavelengths, Multiple Layers and Volume Holograms," *Electronics Letters*, Apr. 13, 1995, bol. 31, No. 8, pp. 621–623.

Kawata et al., "Three–Dimensional Optical Memory with a Photorefractive Crystal," *Applied Optics*, Jul. 10, 1995, vol. 34, No. 20, pp. 4105–4110.

Kardinahl et al., "Photoinduced Refractive–Index Changes in Fulgide–Doped PMMA Films," *Applied Physics A: Materials Science and Processing*, 1995, vol. 61, No. 1, pp. 23–27.

Lessard et al., "Selected Papers on Photopolymers," *SPIE*, 1995, vol. MS 114. (Table of Contents only).

Kawata et al., "Randomly Accessible, Multilayered Optical Memory with as Bi 12 SiO 20 Crystal," *Applied Optics*, Sep. 10, 1996, vol. 35, No. 26, pp. 5308–5311.

Nalwa et al., "Nonlinear Optics of Organic Molecules and Polymers," *CRC Press, Inc.*, 1997, pp. 813–840.

Eichler et al., "High Density Disc Storage by Multiplexed Microholograms," *SPIE—The International Society for Optical Engineering*, Apr. 7–9, 1997, vol. 3109, pp. 239–244.

Diez et al., "High Density Disc Storage by Multiplexed Microholograms," *Cleo 97*, 1997, pp. 258–259.

Elrich et al., "Two–Photon Absorption and Broadland Optical Limiting with Bis–Donor Stilbenes," *Optics Letters*, Dec. 15, 1997, vol. 22, No. 24, pp. 1843–1845.

Eichler et al., "Multiplexed Holograms for the Microholographic Storage Disc," *Technical Digest*, May 10–13, 1998, vol. 8, pp. 77–79.

Khairutdinov et al., "Photochromism of Spirooxazines in Homogeneous Solution and Phospholipid Liposomes," *Journal of the American Chemical Society*, Dec. 16, 1998, vol. 120, No. 49. pp. 12707–12713.

Eichler et al., "Holographic Recording of Microscopic Bragg–Reflectors for Optical Storage," *SPIE*, 1998, vol. 3401, pp. 118–127.

Loy et al., "Cyclization Phenomena in the Sol–Gel Polymerization of a, w–Bis (triethoxysily) Alkanes and Incorporation of the Cyclic Structures into Network Silsesquioxane Polymers," *Journal of the American Chemistry Society*, 1999, vol. 121, pp. 5413–5425.

H.J. Eichler, "Wavelength Multiplexing for the Microholographic Storage Disc," *SPIE*, 1998, vol. 3401, pp. 177–186.

Perry et al., "Organic Optical Limiter with a Strong Nonlinear Absorptive Response," Science, Sep. 13, 1996, vol. 273, pp. 1533–1536, a reprint series from: *1996 by the American Association for the Advancement of Science*.

Two–Photon Polymerization Initiators for three–dimensional Optical Data Storage and Microfabrication, Cumpston, et al., Nature (Mar. 1999) pp. 51–54.

Three–Dimensional Optical Storage Memory, Parthenopoulos, et al., Science vol. 245 pp.–843–845.

Three–Dimensional Optical storage inside Transparent Materials, Glezer, et al., Optics letters vol. 21, No. 24, Dec. 15, 1996. pp. 2023–2025.

Design of Organic Molecules with Large Two–Photon Absorption Cross Sections, Albota, et al., Science vol. 281, (Sep. 1998) pp. 1653–1656.

Cationic Ring–Opening Photopolymerization Methods for Volume Hologram Recording, Waldman, et al., SPIE, vol. 2689. pp. 127–141 (1996).

Determination of Low Transverse Shrinkage in Slant Fringe Gratings of a Cationic Ring–Opening Volume Hologram Recording Material., Waldman, et al., SPIE vol. 3010. pp. 354–372 (1997).

Holographic Recording Properties in Thick Films fo fULSH–500 Photopolymer, Waldman, et al., SPIE vol. 3291. pp. 89–102 (1998).

Photopolymer System and its Application to a Color Hologram, Kawabata, et al., Applied Optics vol. 33(11), pp. 2152–2156, (Apr. 1999).

* cited by examiner

METHOD AND APPARATUS FOR OPTICAL DATA STORAGE USING NON-LINEAR HEATING BY EXCITED STATE ABSORPTION FOR THE ALTERATION OF PRE-FORMATTED HOLOGRAPHIC GRATINGS

BACKGROUND OF THE INVENTION

1. Field of the Invention

The present invention relates to the storage and retrieval of digital data using an optical medium. More specifically, the present invention relates to a method and apparatus for altering a pre-formatted holographic grating in a localized region by thermal disruption of the grating utilizing non-linear optical absorption.

2. Background

Optical data storage technology has tended to follow two complementary lines of development. In one approach, data is encoded as minute variations in the surface of a recording medium, such as a compact disc, or CD. The data are readable using optical means (usually a laser), similar to the way in which data recorded in a magnetic medium are readable with a magnetically-sensitive head, or data recorded in a vinyl medium are readable with a needle. Unlike vinyl recording, however, in optical storage the data are usually stored digitally. For read-only compact discs, data are stored as microscopic pits on the surface of a substrate. In addition, recordable or re-writable bit-based optical systems are readily available. Examples include magneto-optic systems, in which the orientation of a magnetic domain changes the direction of rotation of the polarization of a reflected, focussed light beam; phase-change systems, in which a medium can be locally crystalline or polycrystalline, each of which states have a variance in reflectivity; and, dye-polymer systems, in which the reflectivity of a medium is changed by the high-power illumination.

Each bit of data has specific physical location in the storage medium. The storage density of optical media is limited by physical constraints on the minimum size of a recording spot. Another basic limitation of conventional optical storage is that data are usually stored on the surface of the medium only. Recording throughout the volume of a storage medium would provide an opportunity to increase capacity.

Multi-layer storage is also possible, but usually requires the manufacture of special, heterogeneous, layered recording media, whose complexity increases quickly with the number of layers needed. Most commercially-available multi-layer optical storage media offer no more than two data layers, and come in a pre-recorded format.

An alternative approach to traditional optical storage is based on holographic techniques. In conventional volume holographic recording, laser light from two beams, a reference beam and a signal beam containing encoded data, meet within the volume of a photosensitive holographic medium. The interference pattern from the superposition of the two beams results in a change or modulation of the refractive index of the holographic medium. This modulation within the medium serves to record both the intensity and phase information from the signal. The recorded intensity and phase data are then retrieved by exposing the storage medium exclusively to the reference beam. The reference beam interacts with the stored holographic data and generates a reconstructed signal beam which is proportional to the initial signal beam used to store the holographic image. For information on conventional volume holographic storage, see, for example, U.S. Pat. Nos. 4,920,220, 5,450,218, and 5,440,669.

Typically, volume holographic storage is accomplished by having data written on the holographic medium in parallel, on 2-dimensional arrays or "pages" containing $1 \times 10^6$ or more bits. Each bit is generally stored as information extending over a large volume of the holographic storage medium, therefore, it is of no consequence to speak in terms of the spatial "location" of a single bit. Multiple pages can then be stored within the volume by angular, wavelength, phase-code or related multiplexing techniques.

Unfortunately, conventional volume holographic storage techniques generally require complex, specialized components such as amplitude and/or phase spatial light modulators. Ensuring that the reference and signal beams are mutually coherent over the entire volume of the recording medium generally requires a light source with a relatively high coherence length, as well as a relatively stable mechanical system. These requirements have, in part, hindered the development of inexpensive, stable, and robust holographic recording devices and media capable of convenient operation in a typical user environment.

In order for volumetric optical data storage to mature into a viable data storage option the process must be developed so that the operation is relatively simple, inexpensive and robust. Foremost in this development is accomplishing multi-depth bit-wise optical data storage and/or retrieval. As data recording proceeds to a greater number of depths within the storage medium it becomes increasingly more critical to isolate the recorded bit within a specific area within the medium. In multi-depth storage and/or retrieval, it is also important to write data at a given depth without affecting data at other depths. Further, for multi-depth bit-wise optical data storage and/or retrieval, it is important to have separate write and read conditions, so that readout does not negatively affect recorded data.

BRIEF DESCRIPTION OF THE INVENTION

Briefly, and in general terms, the present invention comprises an improved optical data storage medium including a host material and molecules that exhibit non-linear absorption suspended therein. The molecules exhibiting non-linear absorption may be selected from the group of molecules exhibiting two-photon absorption or reverse saturable absorption. Preferably, the host material is a photopolymer The invention further comprises a method for preparing the optical storage medium. The method comprises dissolving the molecules that exhibit non-linear absorption throughout a photopolymer host material by mixing the dye in the photolymer in concentration levels that approach the solubility limit of the molecules within the host material.

Preferably, the invention also comprises an optical data storage device comprising the optical data storage medium discussed above and having a format hologram stored within the medium. This optical data storage device may take the form of a disk, a tape, a card or the like.

In one embodiment the invention comprises an optical data storage system wherein the storage system uses the optical data storage medium described above when altering a pre-formatted holographic grating in a localized region by non-linear thermal disruption of the grating. Additionally, the invention is embodied in a method for optical data storage wherein the storage medium of the present invention embodies a preformatted holographic grating that is altered in a localized region by non-linear thermal disruption of the holographic grating.

Additionally, another embodiment of the present invention comprises an optical data retrieval system embodying the optical data storage device described above and a method for retrieving data stored on a format hologram written on the optical data storage device of the present invention.

The non-linear absorbing molecules allow for energy in the form of heat to be generated during the optical data storage process. This heat provides for localized alterations to occur in the pre-formatted holographic grating. The non-linear feature of these molecules is instrumental in allowing for alterations to occur at specific depths and locations within the storage medium while limiting the secondary effects on other locations within the storage medium.

DETAILED DESCRIPTION OF THE INVENTION

Figure 1:
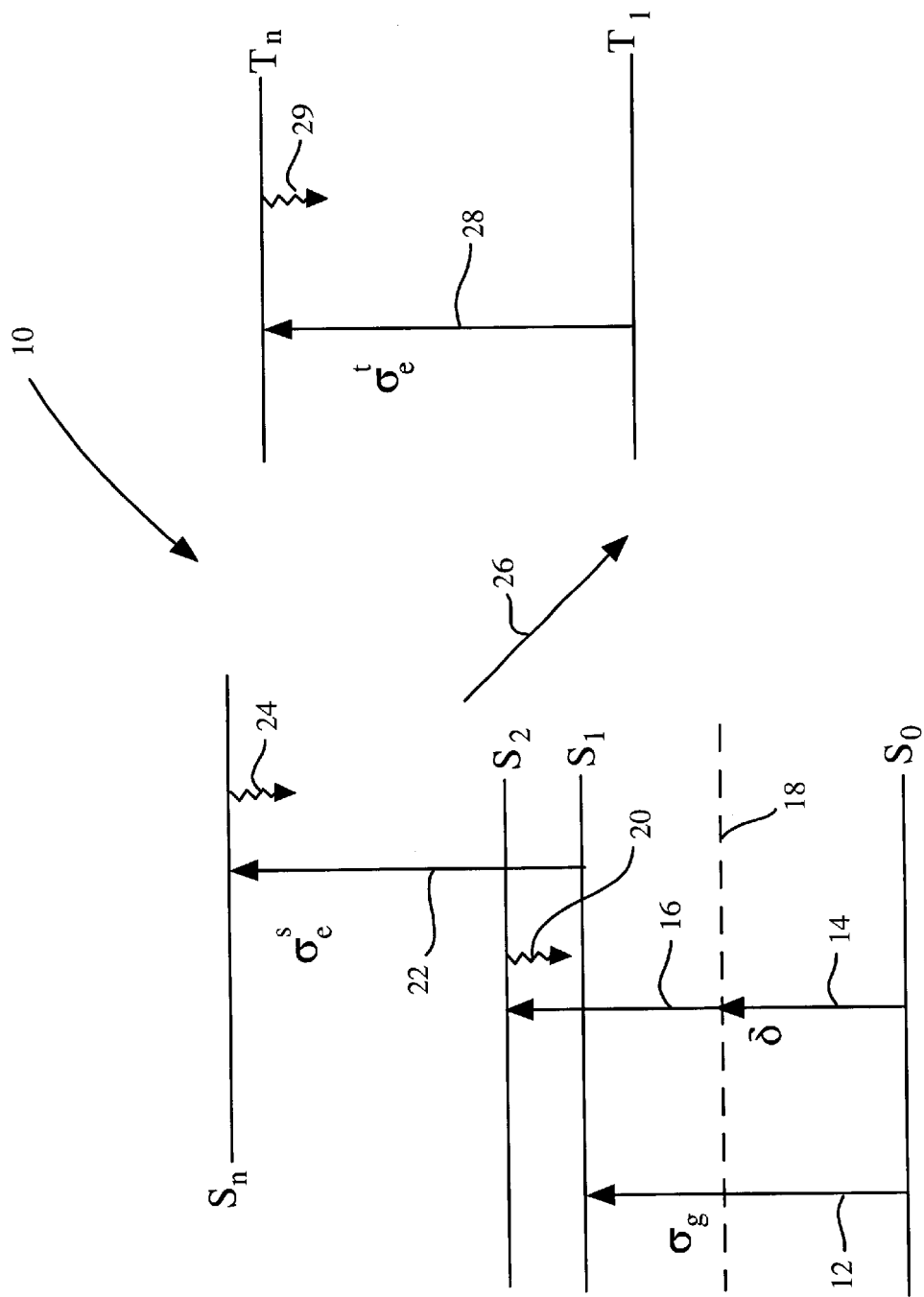
FIG. 1 is a schematic energy level drawing detailing the two photon excited state absorption and thermal disruption that results for a two-photon chromophore exposed to a light source of adequate intensity in accordance with a presently preferred embodiment of the present invention.

In a presently preferred embodiment of the present invention, by way of example and not necessarily by way of limitation, an optical data storage medium, that includes molecules which exhibit non-linear absorption, is used in an optical data storage process in which a pre-formatted holographic grating is altered in a localized region by thermal disruption of the grating. These non-linear absorbing molecules remain transparent at low intensities of light and, thus, allow for light to penetrate to greater depths within the storage medium when recording data, at a plurality of depths in the material. Furthermore, non-linear absorption provides for strong absorption at an accessed data point, and proportionally less absorption at data points above and below the accessed data point and through which lower intensity light passes. It is shown in this disclosure that excitation of a weakly absorbing ground state of such a non-linear absorbing molecule leads to a strong excited state absorption in that molecule on a nanosecond time scale. The initial ground state absorption may occur by a linear or nonlinear (multiphoton) absorption process. Once an upper excited state is achieved, rapid non-radiative relaxation by internal conversion occurs and this process releases energy in the form of heat. The heat produced by this process is sufficient to cause melting or relaxation of polymer chains leading to an inelastic deformation of the pre-formatted holographic grating. This melting or relaxation of the polymer chains is seen as an alteration of the pre-formatted holographic grating that manifests itself as a recording of data within the storage medium. Alteration of a pre-formatted holographic grating in this manner is also described in the co-ending U.S. Patent Application entitled "METHOD AND APPARATUS FOR OPTICAL DATA STORAGE AND/OR RETRIEVAL BY SELECTIVE ALTERATION OF A HOLOGRAPHIC STORAGE MEDIUM", to inventors Sergei Sochava, Sergei Orlov, Tokuyuki Honda, Brian H. Cumpston and Lambertus Hesselink, filed on the same date as the present disclosure.

In a first presently preferred embodiment of the present invention, an optical data storage medium comprises a photopolymer for holographic recording and a solution of molecules that exhibit non-linear absorption dissolved throughout that photopolymer. Those of ordinary skill in the art will readily appreciate that other host materials may be chosen in lieu of a photopolymer. Examples of other host materials can include, polymers, glass or crystal materials. The molecules that exhibit non-linear absorption may be chosen from the group of molecules that provide for two-photon absorption or from the group of molecules that provide for reverse saturable absorption.

Various types of photopolymers may be used with the invention, and numerous examples of suitable photopolymers are described in detail by R. A. Lessard and G. Manivannan (Ed.) in "Selected Papers on Photopolymers", SPIE Milestone Series, Vol. MS 114, SPIE Engineering Press, Bellingham, Wash. (1995). The photopolymer may in particular comprise a photo-acid generator, an active binder and one or more cationic ring-opening monomers. Examples of such photopolymers are disclosed in U.S. Pat. No. 5,759,721, issued Jun. 2, 1998 entitled "Holographic Medium and Process for Use Thereof" by inventors Dhal et.al., "Holographic Recording Properties in Thick Films of ULSH-500 Photopolymer", D. A. Waldman et al., SPIE Vol. 3291, pp.89–103 (1998), in "Determination of Low Transverse Shrinkage in Slant Fringe Grating of a Cationic Ring-Opening Volume Hologram recording Material," Waldman et al., SPIE Vol. 3010, pp. 354–372 (1997), "Cationic Ring-Opening Photopolymerization Methods for Volume Hologram Recording, D. A. Waldman et al., SPIE Vol. 2689, pp. 127–141 (1996), "Holographic Medium and Process",by Dhal et al., WO 97/44714 (1997), "Holographic Medium and Process",by Dhal et al., WO 97/13183 (1997), and "Holographic Medium and Process",by Dhal et al., WO 99/26112 (1999).

In accordance with a presently preferred method of the present invention for preparing the optical data storage medium, the molecules exhibiting non-linear absorption (i.e. chromophores) will be dissolved throughout the photopolymer. The concentration of the chromophore molecules within the photopolymer will vary according to the specific chromophore and the specific photopolymer being used. Suitable chromophore concentrations can readily be determined by a skilled artisan. The concentration of chromophore may approach the solubility limit of the chromophore within the photopolymer being used. Generally, the attainable concentration of the chromophores in relation to the photopolymer mixture is on the order of about 0.1 mol/liter up to about 1.0 mol/liter, depending on the particular chromophore.

The data storage medium of the invention may utilize a variety of well known volume holographic storage media by inclusion of suitable non-linear absorption chromophores in the media. The storage media preferably comprises a photosensitive cationic ring opening polymer or "CROP" formulation together with one or more non-linear absorption dyes dispersed or dissolved therein. Presently preferred photopolymeric media include the type of photopolymer holographic recording media described in U.S. Pat. No. 5,759,721, issued Jun. 2, 1998 entitled "Holographic Medium and Process for Use Thereof" by inventors Dhal et.al., "Holographic Recording Properties in Thick Films of ULSH-500 Photopolymer", D. A. Waldman et al., SPIE Vol. 3291, pp.89–103 (1998), in "Determination of Low Transverse Shrinkage in Slant Fringe Grating of a Cationic Ring-Opening Volume Hologram recording Material", Waldman et al., SPIE Vol. 3010, pp. 354–372 (1997), "Cationic Ring-Opening Photopolymerization Methods for Volume Hologram Recording, D.A. Waldman et al., SPIE Vol. 2689, pp. 127–141 (1996), "Holographic Medium and Process",by Dhal et al., WO 97/44714 (1997), "Holographic Medium and Process",by Dhal et al., WO 97/13183 (1997), and "Holographic Medium and Process",by Dhal et al., WO 99/26112 (1999).

In preparing a photopolymer, in accordance with a preferred embodiment of the present invention, the proportions of photo-acid generator, active binder and cationic ring opening monomer may vary over a wide range and the optimum proportions for specific mediums and methods of use can readily be determined by those of ordinary skill in the art. Photopolymers of this nature are disclosed in detail in the references cited above. For example, photopolymers of the described composition can comprise about 3 to about 10 percent by weight of the photo-acid generator, about 20 to about 60 percent by weight of the active binder and from about 40 to about 70 percent by weight cationic ring-opening monomer(s). Other suitable compositions can be readily determined empirically by those of ordinary skill in the art. Additionally, a sensitizer may be added to the photopolymer material to allow format holograms to be recorded at a desired wavelength. Those of ordinary skill in the art will realize that the sensitizer chosen for a specific application will be suitable for the corresponding photopolymer. The sensitizer chosen will generally exhibit absorption at the desired wavelength and, upon excitation, the sensitizer will be capable of transferring an electron to the photo-acid generator.

The photopolymer compositions provide a monomer/polymer having a relatively low refractive index and an active binder of relatively high refractive index. Photoinduced polymerization of the monomer induces phase separation of the monomer/polymer and active binder to form low and high refractive index regions to record the hologram. The term "active binder" is used herein to describe a material which plays an active role in the formation of a holographic grating. That is, the holographic recording process imparts a segregation of active binder from monomer and/or polymer. The active binder is appropriately chosen such that it provides a periodic refractive index modulation in the photopolymer. An active binder, in this sense, can be differentiated from the typical use of inert binder materials in photopolymers to impart mechanical properties or processability. The active binder may additionally serve other purposes, such as those of a conventional inert binder.

In a preferred embodiment, photopolymer compositions generally comprise one or more photoacid generators, one or more sensitizing dyes, polymerizable CROP monomers, and a high refractive index active binder or binders, which are typically low molecular weight silicones. Photoacid generators used in these compositions include 4octylphenyl (phenyl)iodonium hexafluoroantimonate, bis(methylphenyl) iodonium tetrakis penta(fluorophenyl) borate, cyclopentadienyl cumene iron(II) hexafluorophosphate, and cumyltolyliodonium tetrakis (pentafluorophenyl)borate. The sensitizer for these photoacid generators is preferably 5,12-bis(phenyl-ethynyl)naphthacene, which sensitizes the photoacid generators to absorption at green wavelengths. The monomer is preferably a difunctional cyclohexene oxide monomer such as 1,3-bis[2-(3{7-oxabicyclo[4.1.0]heptyl}) ethyl]tetramethyl disiloxane, which is available from Polyset Corp under the name PC-1000™, and/or a tetrafunctional monomer such as tetrakis[2-(3{7-oxabicyclo[4.1.0] heptyl })ethyl(dimethylsilyloxy)silane, which is available from Polyset Corp under the name PC-1004™. The active binder is typically Dow Corning 710™ poly (methylphenylsiloxane) fluid, Dow Corning 705™1,3,5-trimethyl-1,1,3,5,5-pentaphenyltrisiloxane, and/or a like silicone oil. The above combined ingredients are generally referred to as "photopolymer."

In addition to the above photopolymer, the optical data storage medium of the invention also comprises a non-linear absorber dye. Preferably, the non-linear absorbing dye will comprise either a two photon chromophore, or a reverse saturable absorber chromophore, which is dissolved or dispersed homogeneously throughout the photopolymer. The two photon chromophores used in this example are 4,4'-bis-N-metatolyl-N-phenyl-aminobiphenyl (tolyl-phenylaminobiphenyl), 4,4'-bis-N,N dimethyl aminobiphenyl, and/or 4,4'-bis-N,N-dimethylaminostilbene, which are available from Aldrich Chemical Co. and which may be used as received.

The following is a specific example of the deployment of a two-photon chromophore within a photopolymer as used in the optical data storage process. This example illustrates how the temperature rise can be estimated during the absorption process for a given concentration of two-photon chromophores dispersed within a photopolymer. The presence of a significant temperature increase gives rise to the alteration of the pre-formatted hologram grating during the optical data storage process.

In this example, the optical storage medium is prepared in a manner similar to that described in the above cited references, but with the addition of a two photon chromophore. The PC-1000™ and PC-1004™ monomers from Polyset Corp. are dried prior to use by passage through activated silica (high purity grade, 70–230 mesh) which has been heated for two days at 155 degrees C under dry atmosphere. The Dow 705™ binder is purchased through Kurt J. Lesker Company and is dried for 24 hr at 155 degrees C under vacuum prior to use. Cumyltolyliodonium tetrakis (pentafluorophenyl)borate from Rhodia Inc. is used as received, and 5,12-bis(phenyl-ethynyl)naphthacene from Aldrich Chemical Co. is used as received. The two-photon dye, tolyl-phenylaminobiphenyl, is prepared as described by S. Thayamunavan et al. In "Synthesis of Unsymmetrical Triarylamines for Photonic Applications via One Pot Palladium-Catalyzed Aminations" in Chemistry of Materials, Vol. 9, pp. 3231–3236 (1997).

In one embodiment, the photopolymer is made using 3–10% (w/w) of cumyltlolyliodonium tetrakis (pentafluorophenyl)borate photoacid generator, 0.0020–06% (w/w) of 5,12-bis(phenyl-ethynyl)naphthacene sensitizer, 40–75% (w/w) of PC-1000™/PC-1004™ (difunctional/tetrafunctional) monomer mix, and 20–60% (w/w) of Dow Corning 705™. The monomer mix generally includes both PC-1000™ and PC-1004™, and the weight percent of PC-1000™/PC-1004™ (difunctional monomer/ tetrafunctional monomer) within the monomer mix can be varied substantially. Photopolymer having a monomer component of pure PC-1000™ as described in this example have been found to be effective. A preferred PC-1000™/PC-1004™ ratio of the monomer mix is between about 40/60 and 60/40 percent by weight, and more preferably about 50/50 percent by weight. The above ingredients of the photopolymer may be varied within the above weight percent ranges as required for particular uses and properties, such as optical media thickness, substrate composition, laser wavelength, shelf life, grating formation sensitivity, dynamic range, shrinkage, and angular selectivity, as is well known in the art. The above specific photopolymer is merely exemplary, and should not be considered limiting. Various other photopolymers may be used with the invention, and are considered to be within the scope of this disclosure.

To prepare a photopolymer with a two photon chromophore in accordance with the invention, 5.16 g of tolyl-phenylaminobiphenyl (Mw=516 g) is dissolved in methylene chloride and is added to 10 ml of the photopolymer comprising the combined above ingredients. The photopolymer/dye mix is thoroughly stirred so that the tolyl-phenylaminobiphenyl is homogeneously dissolved throughout the photopolymer. The resulting photopolymer is dried by purging with inert gas ($N_2$ or Ar) for 12 hours to remove the methylene chloride. The tolyl-phenylaminobiphenyl may be substituted by 4,4'-bis-N,N dimethyl aminobiphenyl, or 4,4'-bis-N,N-dimethylaminostilbene. These specific two photon chromophores are merely exemplary, and should not be considered as limiting. Higher solubility levels in the above photopolymer can be obtained through use of similar two photon chromophores which are functionalized to improve solubility. For example, the use of 4,4'-bis-N,N-di(n-butyl) aminostilbene as a two photon chromophore at relatively high concentrations is described in "Two-Photon Polymerization Initiators for Three-Dimensional Optical Data Storage and Microfabrication" by Brian Cumpston et al., in Nature, Vol. 398, March, 1999, pp.54–57 and in "Two-photon Absorption and Broadband Optical Limiting with Bis Donor Stilbenes" by Erhlich et al., Optics Letters, Vol.22 No. 24, Dec. 15, 1997, pp. 1843–1845.

The photopolymer is placed between glass slides, plates or sheets separated by a desired thickness to provide a photopolymer layer for optical data storage. The glass plates are mechanically held apart at a 120 micron separation and then retained at that separation and held in place by a UV curable adhesive. The photopolymer is placed between the 120 micron-separated sheets to form a photopolymer layer. The glass sheets may alternatively be held apart by PTFE or polyethylene spacers of desired thickness.

The photopolymer layer as described above preferably is thermally pre-cured at a temperature of about 75 degrees Celsius for about 10 hours. This pre-cure provides for an initial degree of polymerization of about 30 percent and helps avoid unwanted shrinkage in subsequent format hologram recording and data writing steps. Other temperature and time period combinations may also be used that allow for an initial polymerization of about 30 percent.

In one embodiment, a format hologram grating is then recorded in the photopolymer layer using a pair of light beams with a wavelength of 532 nanometers incident on opposite sides of the optical storage device. The reflection grating spacing can be tuned for a desired data retrieval wavelength by adjusting the angles of the hologram recording beams. To use data retrieval wavelengths substantially longer than the wavelength of the recording beam, right angle prisms can be used to achieve high angles of incidence at the storage device, as is well known to those skilled in the art. Preferably, the recorded reflection grating spacing is about $1.03\lambda/2n$, where $\lambda$ is the desired data retrieval wavelength and n is a refractive index of the medium. When the reflection grating spacing is about 3% larger than $\lambda/2n$, efficient resolution is achieved for bit detection using retrieval beams having a numerical aperture of about 0.4 to 0.65. Preferably, the diffraction efficiency of the format grating on the order of 20 to 50 percent, and the exposure energy may be in the range of about 40 to 100 mJoules/cm$^2$.

Preferably, the resulting photopolymer hologram is then fixed to render the photopolymer insensitive to further holographic exposure at the wavelength used to record the format hologram. Fixing can be accomplished by exposure to white light or exposure to the same wavelength light used to record the format hologram. If photochromic or thermochromic media are used, the absorption may be subsequently changed by appropriate illumination or heating, respectively.

Additional methods for format hologram recording are described in co-pending U.S. patent application Ser. No. 09/016,382, "Optical Storage by Selective Localized Alteration of a Format Hologram and/or Retrieval by Selective Alteration of a Holographic Storage Medium" to Hesselink et al., filed Jan. 30, 1998. The configuration of the format hologram may vary as required for particular uses of the invention, to provide different formats for subsequent data writing. A variety of complex format hologram grating structures, including tube, layer and cylindrical shell hologram grating structures, are described in co-pending U.S. patent application Ser. No. 09/229,457, filed on Jan. 12, 1999, to Daiber et al.

As noted above, the two photon chromophores noted in the above example are only exemplary, and many other two photon chromophores may be used with the invention. For example, molecules of this nature include, but are not limited to, the group of two-photon chromophore molecules disclosed in the article J. E. Ehrlich, et. al., entitled "Two-photon absorption and broadband optical limiting with bis-donor stilbenes" published in Optics Letters, Dec. 15, 1997 (Volume 22, No. 24 Pages 1843–1845). These two-photon chromophores characteristically have large two-photon absorption cross-sections. For example, these chromophores may comprise a class of symmetrically substituted conjugated organic molecules, included in this class are donor-pi-donor, donor-acceptor-donor, acceptor-pi-acceptor, and acceptor-donor-acceptor structures. The symmetric substitution of electron rich or electron deficient groups onto conjugated molecules increases the two-photon absorption cross-section by over an order of magnitude compared to the unsubstituted molecule. The wavelength at which the two-photon absorption is strongest can be tuned by changing the overall conjugation length of the chromophore and by adjusting the electron donor and/or acceptor strengths. These two-photon chromophores are presented by example and are not intended to limit the invention. Those of ordinary skill in the art will realize that other two-photon absorbing molecules, or any other molecules exhibiting non-linear absorption, can be dissolved within the photopolymer forming the optical data storage medium and still be within the inventive concept herein disclosed.

FIG. 1 is a schematic energy level drawing 10 detailing the two photon excited state absorption and thermal disruption that results for a two-photon chromophore exposed to a light source of adequate intensity . Arrow 12 indicates the linear ground state absorption cross section $\sigma_g$, of the two photon chromophore, representing its transition from the singlet ground state $S_0$, to a first excited singlet state $S_1$. Absorption cross section can be defined as the effective area for photon capture by a molecule or the ability of the molecule to absorb light. In the non-excited ground state $S_0$, the paired electrons of the molecule have opposite spin orientation. In comparison to the ground state $S_0$, the excited singlet state $S_1$, has one of the paired electrons elevated to an excited state while the pair remains in opposite spin orientation. The excited state is reached by subjecting the molecule to a form of energy, in this instance a light source. Arrow 14 and arrow 16 are illustrative of the simultaneous absorption of two photons, both of approximately half the frequency of the photon absorbed in arrow 12. The broken line 18 illustrates a virtual state that only exists in applications where two-photon excitation is used. The overall two photon absorption cross section $\delta$, that is exhibited by these two-photon chromophores is characteristically weak compared to linear absorption at low intensity. Once the first two-photon singlet excited state $S_2$ is populated (i.e. electrons present) a non-radiative relaxation to $S_1$ may ensue, as indicated by arrow 20. This relaxation period is typically defined in terms of femtoseconds or shorter.

Arrow 22 illustrates the excited singlet state absorption cross section $\sigma_e^s$, of a photon as it is excited from the first singlet excited state $S_1$, to an upper level excited state $S_n$. With a two photon process, such as illustrated in FIG. 1, the excited state absorption cross section $\sigma_e$, can be exceptionally larger than the effective two-photon absorption process. Once the upper level singlet excited state $S_n$, is achieved a non-radiative relaxation 24 ensues in which energy in the form of heat is emitted. The heat that is given off during the relaxation 24 is used in the optical data storage process to alter the pre-formatted holographic grating.

The intersystem crossing rate, represented by arrow 26, signifies the chromophore moving from an excited singlet state $S_1$ to a corresponding triplet state $T_1$, In the triplet state the electrons are no longer in opposite spin orientation. In some systems, the two-photon chromophore will exhibit large intersystem crossing rates from $S_1$ to $T_1$, such that the first excited triplet state $T_1$ is rapidly populated. The lifetime of $T_1$ is typically on the order of one microsecond. Arrow 28 indicates the excited triplet state absorption cross section $\sigma_e^t$. Once the upper level triplet state $T_n$ is achieved a non-radiative relaxation 29 can ensue in which energy in the form of heat is emitted. The heat given off during this relaxation period is used in the optical data storage process to alter the pre-formatted holographic grating. Thus, a previously inaccessible single-photon absorbing state ($S_n$ or $T_n$) is created in the chromophore molecule by weak non-linear excitation of the ground state. The amount of $S_1$ or $T_1$ population which can be produced is dependant upon the integral over time of the square of the laser flux. If the pulse length is increase and the flux is held constant, the $S_1$ or $T_1$ population increases accordingly. For relatively long pulse length laser sources (i.e. approximately equal to the $S_1$, lifetime of about 1 ns) it is possible at sufficiently high flux to build up an appreciable population of $S_1$ or $T_1$, on the order of percents of the initial $S_0$ population. Given a sufficiently large $S_1$ to $S_n$ excited state cross section, the optical density for the $S_1$ to $S_n$ transition can become significant under these conditions. Furthermore, since $S_n$ to $S_1$ relaxation is typically very fast (less than 10 picoseconds) the absorbed optical energy is efficiently converted into heat. The magnitude of the excited state absorption is not observed to be significant in the case of pulse lengths on the time scale of 10 picoseconds, for the same flux, since a much smaller $S_1$ population is produced and thus the optical density for the $S_1$ to $S_n$ transition is much smaller in this case.

The process can be mathematically analyzed in the following manner to determine the population of a given state, the corresponding linear absorption of that state and the temperature rise encountered during the absorption process. Since the pulse duration used (generally about 5 ns) is greater than the relaxation of the $S_1$ state (generally about 1 ns), a steady state equation can be used to calculate the population of $S_1$. The equation reads as follows:

$$N_1/N_0 = 0.5 \delta \phi^2 / k$$

Where $N_1$ and $N_0$ are the excited state and initial ground state number densities (cm⁻) respectively, (i.e. the number of molecules in the first excited state relative to the number of molecules in the ground state), $\delta$ is the two-photon chromophore strength of absorption, or, absorptivity (cm⁴s/photon/molecule), $\phi$ is the photon flux, or, laser power (photons/cm²/s), and k is the excited state lifetime (s).

The linear absorption due to the excited state population can then be calculated using:

$$T = \exp(-\sigma_e N_1 L)$$

Where $\sigma_e$ is the excited state absorption cross section (cm²), L is the pathlength through which the light travels (cm), and T is the light transmission through the material.

Additionally, the temperature rise can be calculated using:

$$\Delta T = E_{abs}/(VC_p)$$

Where $E_{abs}$ is the absorbed energy (J), given by $(1-T)E_p$, where $E_p$ is the pulse energy (J), V is the interaction volume (cm³) in which the heating takes place, and $C_p$ is the heat capacity of the material (J/cm³/K).

In this particular application, the light source has a numerical aperture (NA) of 0.55 and a 16 ns pulse length. Additionally, a 0.3 micro joule (J) pulse is used that has a photon flux $\phi$ of $4.6 \times 10^{27}$ photons/cm²/s at the beam focus. This example uses a chromophore of the substituted (tolyl-phenylamino) biphenyl class, having a strength of absorption $\delta$, of $3 \times 10^{-48}$ cm⁴s/photon/molecule at a wavelength of 532 nm and an excited state lifetime k, of approximately $10^{-9}$ seconds. At a chromophore concentration of 0.1 mole/liter, the initial number density is $6 \times 10^{19}$ cm⁻³ leading to an excited state population of $1.9 \times 10^{18}$ cm$^{-3}$. This chromophore has an excited state absorption cross-section of $10^{-16}$ cm$^2$ and assuming the interaction length to be equivalent to the Rayleigh length, i.e. 2.1 micrometers, the transmittance is 0.96, or a 4% absorption. The total absorbed energy of the photopolymer and chromophore composition is 12.0 nJ. The heat capacity $C_p$ of the photopolymer, is 2J/cm$^3$/K and thus, for an interaction volume V, of $2.3 \times 10^{-12}$ cm$^3$, the temperature rise is calculated to be about 2500 degrees K.

In another presently preferred embodiment of the present invention, the molecules of the optical data storage medium that exhibit non-linear absorption are molecules which provide reverse saturable absorption. As an example, molecules of this nature include, but are not limited to, the group of molecules disclosed an article by J. W. Perry, et. al., entitled "Enhanced reverse saturable absorption and optical limiting in heavy-atom-substituted pthalocyanines" published in Optics Letters, May 1, 1994 (Volume 19, No. 9 Pages 625–627). For example, these reverse saturable absorbers may include (a) metal/ligand complexes, such as phthalocyanines, napthalocyanines, or porphyrins, (b) fullerenes, or (c) transition metal cluster compounds. These materials characteristically exhibit finite but very weak linear absorption at the wavelength of interest. These reverse saturable absorbers are presented by example and are not intended to limit the invention. Those of ordinary skill in the art will realize that other reverse saturable molecules, or any other molecules exhibiting non-linear absorption, can be dissolved within the photopolymer material forming the optical data storage medium and still be within the inventive concept herein disclosed.

Figure 2:
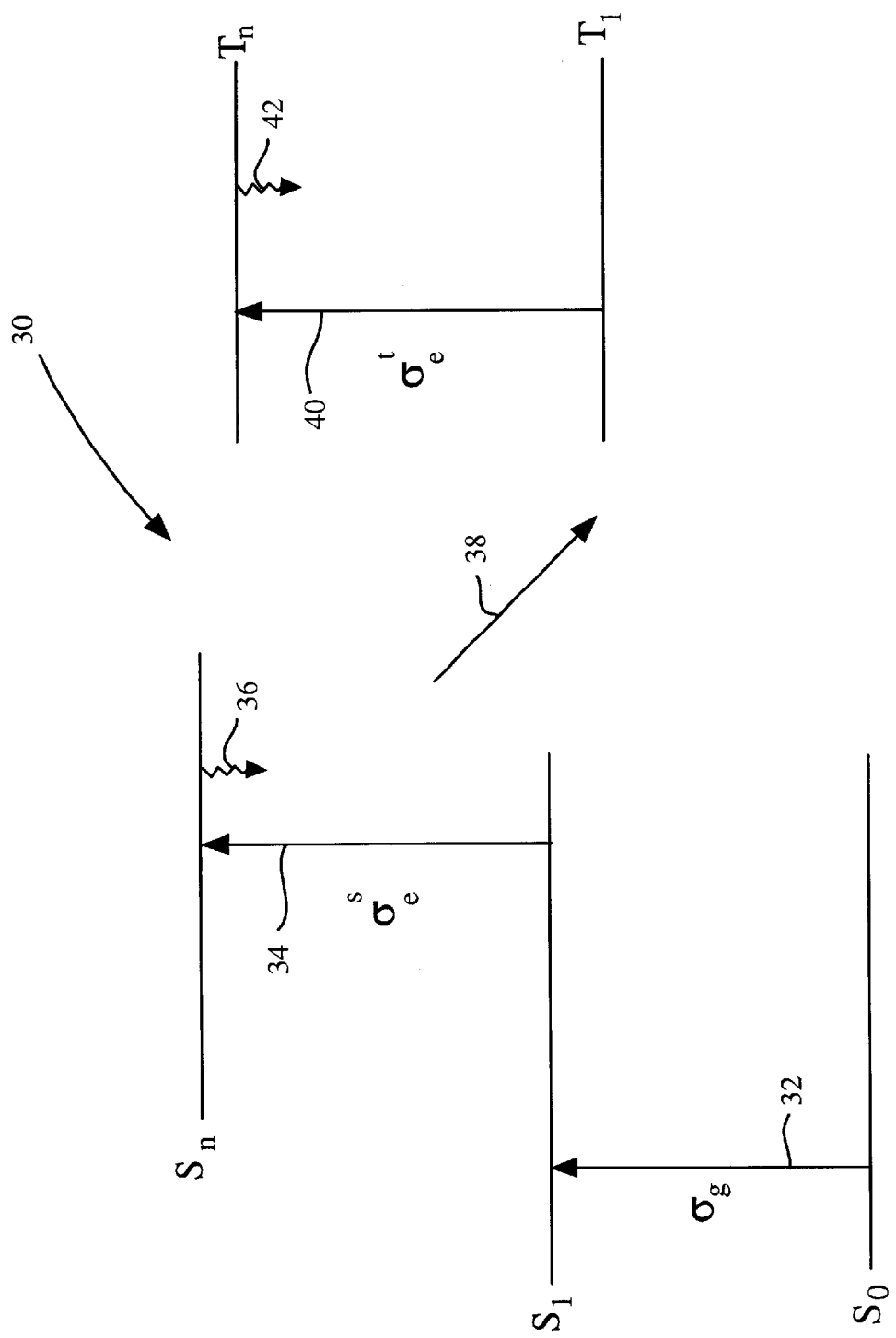
FIG. 2 is a schematic energy level drawing detailing the single photon excited state absorption and thermal disruption that results for a reverse saturable absorber exposed to a light source of adequate intensity in accordance with a presently preferred embodiment of the present invention.

FIG. 2 is a schematic energy level diagram 30 detailing the single photon excited state absorption and resulting thermal disruption for a molecule exhibiting reverse saturable absorption. Arrow 32 illustrates the ground state absorption cross section $\sigma_g$, of a photon as it transitions from the singlet ground state $S_0$, to a first excited singlet state $S_1$. Generally, reverse saturable absorbers will experience weak linear absorption between the singlet ground state and the first excited singlet state $S_1$.

Arrow 34 illustrates the excited singlet state absorption cross section $\sigma_e^s$, of a photon as it moves from the first singlet excited state $S_1$, to an upper level excited state $S_n$. For reverse saturable absorbers, such as illustrated in FIG. 2, the excited state absorption cross section $\sigma_e$ is much greater than the ground state absorption cross section $\sigma_g$. Once the upper level singlet excited state $S_n$, is achieved a non-radiative relaxation period 36 ensues in which energy in the form of heat is emitted. The heat given off during this relaxation period is used in the optical data storage process to alter the pre-formatted holographic grating. The intersystem crossing rate, represented by arrow 38, signifies the transfer of energy encountered when the chromophore moves from an excited singlet state $S_1$ to a corresponding triplet state $T_1$. Arrow 40 indicates the excited triplet state absorption cross section $\sigma_e^t$. Once the upper level triplet state $T_n$ is achieved by subsequent linear absorption, a non-radiative relaxation 42 ensues in which heat is emitted. The heat given off during this relaxation period is used in the optical data storage process to alter the pre-formatted holographic grating.

The reverse saturable absorbers exhibit finite but comparatively weak linear absorption at the wavelength that is of interest when altering a pre-formatted holographic grating. Due to this property, a significant excited-state population can only be produced at high incident intensities. The materials, however, possess significantly stronger linear excited-state absorption from either higher singlet or triplet states. That is, the excited state absorption cross section $\sigma_e$ is much greater than the ground state absorption cross-section $\sigma_g$, at the same wavelength.

The following is a specific example of the use of a reverse saturable absorber molecule used in the optical data storage process of the invention. This example illustrates how the temperature rise can be determined during the absorption process for a given concentration of reverse saturable absorbers dispersed within a photopolymer. The presence of a significant temperature increase gives rise to the alteration of the pre-formatted hologram grating during the optical data storage process.

In this example, the photopolymer storage media is prepared generally as described above, with the exception that the two photon chromophore is replaced with the reverse saturable absorption chromophore indium chloride tetra (tert-butyl) phthalocyanine (InPc). In all other respects, the photopolymer composition and sample preparation is identical to that described in the above example for a two photon chromophore. The InPc for this example is prepared as described by J. N. Esposito et al., in "Inorganic Chemistry," Vol. 6, p. 1116 (1967), which is incorporated herein by reference. The InPc is dissolved in the photopolymer as described above. The reverse saturable absorber zinc chloride tetra(tert-butyl)phthalocyanine (Zn(Pc), which is available from Aldrich Chemical Co., can also be used in the same manner.

The compound indium chloride tetra(tert-butyl) phthalocyanine (InPc) exhibits strong reverse saturable absorption at a wavelength of 532 nm. At this wavelength the ground state absorption cross-section $\sigma_g$, is $3 \times 10^{-18}$ cm$^2$ and the excited state absorption cross-section $\sigma_e$, is $75 \times 10^{-18}$ cm$^2$. This particular molecule has a large intersystem crossing rate due to the heavy atom effect, therefore, it is assumed that all of the population excited to $S_1$, goes into $T_1$. Also, because the lifetime of $T_1$ is on the order of microseconds, the relaxation processes are assumed to be negligible. Thus, the population in $T_1$ ($N_e$) (cm$^3$) can be described by the following equation:

$$N_e = N_g[1-\exp(-\sigma_g \phi \tau)]$$

Where $N_g$ is the initial ground state population (cm$^{-3}$), $\phi$ is the incident flux (photon/cm$^2$/s) and $\tau$ is the pulsewidth (s).

In this example, the light source is characteristically a 50 mW 532 nm laser focussed to a 1 micron spot with a photon flux of approximately $10^{25}$ photon/cm$^2$/s. Calculations for the temperature rise are identical to those performed in the preceding two-photon chromophore application. For a pulse length of 500 ns and an initial ground state population of $1.55 \times 10^{19}$ cm$^{-3}$ (25 mM concentration), the temperature rise is estimated to be approximately 1100 degrees K.

The energy in the form of heat that is emitted during the non-radiative relaxation periods provides the procedure whereby data can be written on to or erased from the storage medium. This procedure can be employed in both Bragg-matched and Bragg-mismatched formatted holograms.

In a presently preferred embodiment of the present invention, a uniform, format hologram is recorded in the optical storage medium at a defined wavelength so that it is Bragg-matched locally for readout by a focussed beam. The focused beam can either be the same wavelength as used in the formatting step or a different wavelength. The format grating which results provides uniformly high reflectivity for the readout beam, thus the material is uniformly "on" (a binary 1). Data is written by locally heating the material per either the reverse saturable absorber process or the two-photon chromophore absorption process described above. The absorbed light heats the material locally, causing inelastic local alteration of the format grating and, thereby, destroying the Bragg selectivity for the readout wavelength. Thus, wherever a bit of information is recorded, the reflectivity drops and this drop in reflectivity can be discriminated from the surrounding high-reflectivity uniform grating.

In another presently preferred embodiment of the present invention, a uniform, format hologram is recorded in the storage medium at a defined wavelength so that it is Bragg-mismatched locally for readout by a focussed beam. The focused beam can either be the same wavelength as used in the formatting step or a different wavelength. The format grating which results provides uniformly low reflectivity for the readout beam, thus the material is uniformly "off" (a binary 0). Data is written by locally heating the material per either the reverse saturable absorber process or the two-photon chromophore absorption process described above. The absorbed light heats the material locally, causing inelastic local alteration of the format grating and, thereby, creating the Bragg selectivity for the readout wavelength. Thus, wherever a bit of information is recorded, the reflectivity increases and this increase in reflectivity can be discriminated from the surrounding low-reflectivity uniform grating.

Figure 3:
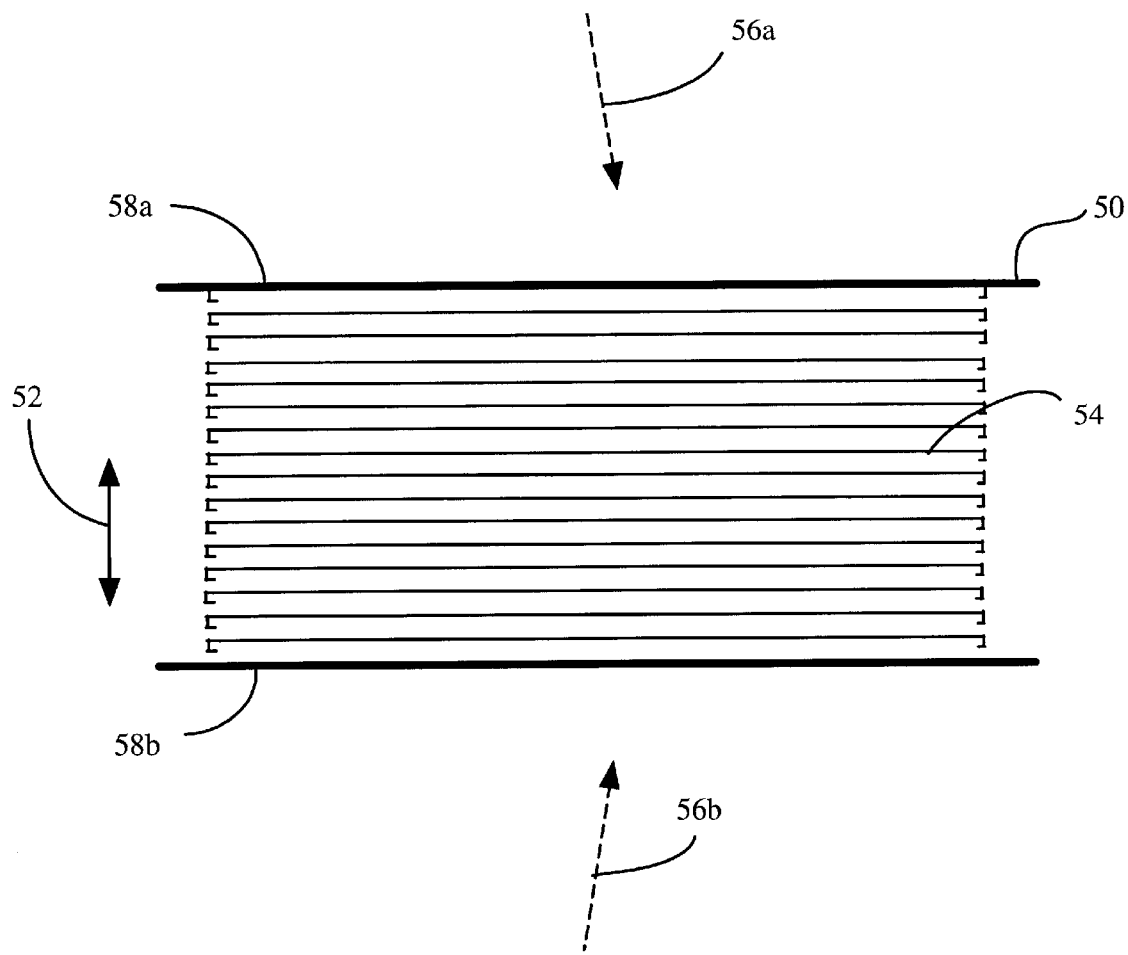
FIG. 3 is a schematic drawing of an elevational cross section of an optical data storage medium and two planewave beams used to form interference fringes within the medium.

FIG. 3 is a cross-sectional elevational schematic drawing of the optical data storage medium 50 used in a presently preferred embodiment of the invention. This optical recording medium will be comprised, in part, of the non-linear absorbing molecules discussed previously. The optical data storage medium 50 shown in FIG. 3 has a periodic, spatially-modulated refractive index that varies along a single depth axis 52 of the material, defining a plurality of reflective Bragg fringes 54. Preferably, the optical data storage medium 50 is typically on the order of magnitude of 100 microns in thickness, for instance, about 100–200 $\mu$m, and in particular about 125 $\mu$m and the spacing between Bragg fringes 54 is approximately one thousand times smaller, on the typical order of magnitude of 100 nanometers, for instance about 170 nanometers. The spacings shown in FIG. 3, therefore, are not drawn to scale.

The periodic structure of the optical data storage medium 50 defines a first Bragg reflection condition, so that the medium 50 is particularly reflective to light of certain frequencies incident upon the medium 50 at specific angles, and is relatively transparent to light from other sources. Specifically, if the spacing between Bragg fringes is d, the index of refraction is n and the light is incident upon the medium 50 at an angle of $\theta$ with wavelength $\lambda$, then the Bragg reflection condition is that the quantity $2nd\sin\theta$ should be an integer multiple of $\lambda$: $m\lambda=2nd\sin\theta$, for m=1, 2, 3, etc., in which $\theta$ is the angle between the direction of propagation of a plane wave and a Bragg fringe within the medium. For reflection holograms, m=1. In particular, the Bragg reflection condition depends on the spacing between consecutive fringes. For reflection grading in which the fringes are parallel to the surface of medium $\theta=\pi/2$, therefore $\lambda=2nd$. "Optical fringe spacing" is defined as nd.

Figure 4:
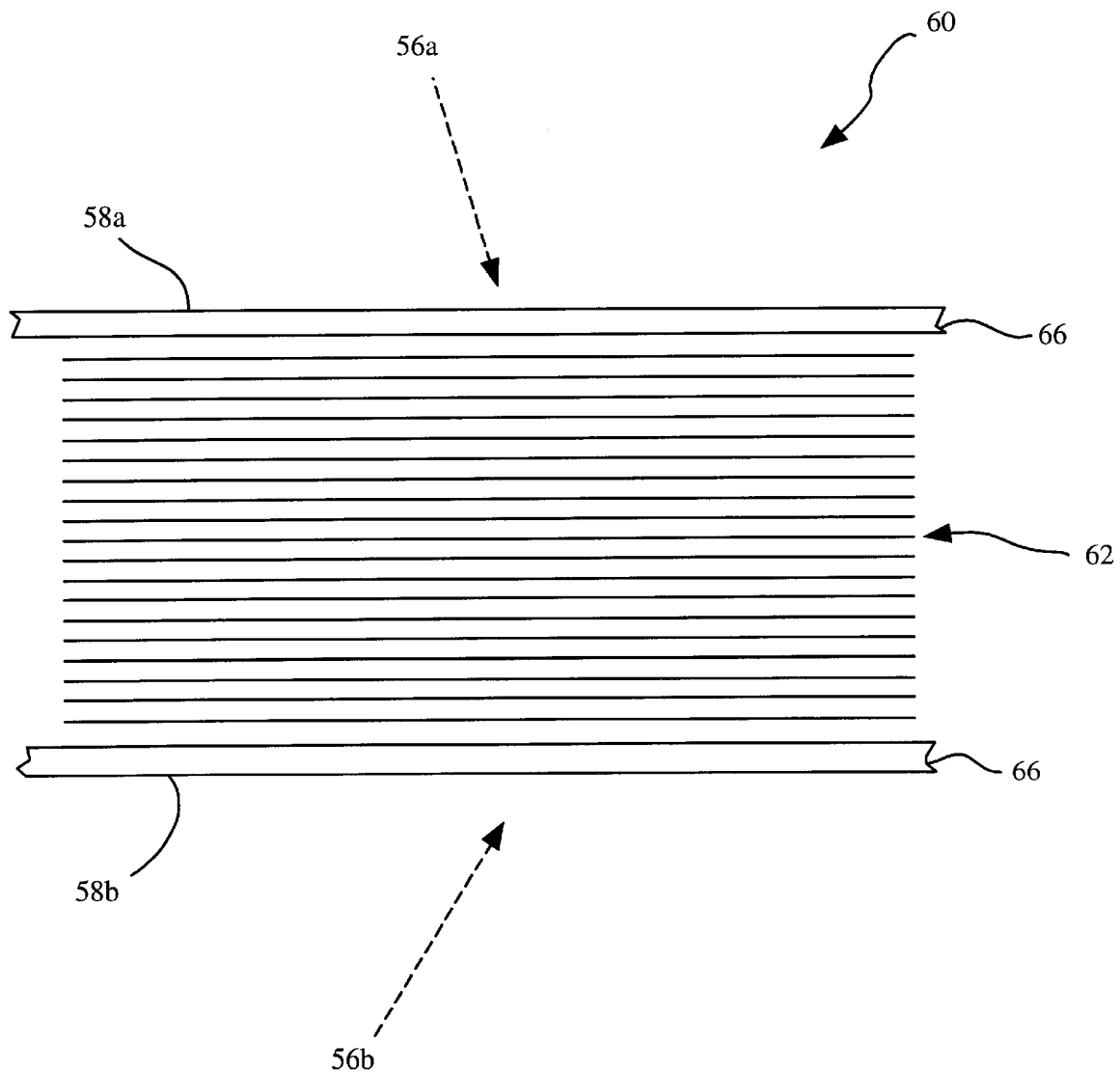
FIG. 4 is a schematic diagram of an elevational cross section of an optical data storage device in accordance with a presently preferred embodiment of the present invention.

A presently preferred method for creating an optical data storage device 60 is to use the holographic recording technique illustrated in FIG. 4. In this illustration the device that is being formed is an optical data storage disk, it is also conceivable and within the inventive scope to form the device as a tape, card or other suitable optical data storage devices as are known by those of ordinary skill in the art. Here the optical data storage device 60 is formed by exposing a planar, initially homogeneous photosensitive layer 62 of material to two coherent monochromatic light beams 56a–b. Beams 56a–b can be generated from a single beam of laser light using a beam splitter and optical elements well-known to those of ordinary skill in the art of holography. The photosensitive layer 62 can be formed, for example, by depositing a small amount of optical data storage medium between two glass plates 66. Preferably, the optical data storage medium will comprise a photopolymer, having molecules exhibiting non-linear absorption dissolved throughout, as discussed previously and shown in the above examples. The beams 56a–b are incident upon opposite sides 58a–b of the material at slightly oblique angles. An interference pattern of light and dark fringes is established that alters the refractive index of the bulk material in those parts of the layer where the beams 56a–b constructively interfere. The spacing between these fringes will be on the order of half the wavelength of beams 56a–b. The exposed hologram is then fixed to render the photopolymer insensitive to further exposure at the wavelength used to record the format hologram. Once the hologram is fixed the photopolymer is referred to as being polymerized or resulting in a photopolymer product. A suitable photopolymer for this process will typically be formed from one or more cationic ring-opening monomers, an active binder, a photo-acid generator, and an optional sensitizer. Non-linear absorbing molecules, such as the two-photon chromophores or reverse saturable absorbers will be dissolved within the photopolymer, described in detail above.

It should be emphasized that the optical storage medium of the present invention does not, typically, store data holographically in the conventional manner by simply recording a hologram containing digital data. In particular, the format hologram does not itself represent recorded data. Instead, data is stored bit-by-bit at discrete physical locations within the recording medium by altering the format hologram during writing. In this sense, the data storage of the present invention more closely resembles bit-based optical storage than conventional page-based holographic volume storage. Strictly speaking, in a presently preferred embodiment of the present invention, holography is used to format the bulk recording material only, and writing data to the medium is performed using essentially non-holographic techniques. The present invention can be employed on a recording medium that has a spatially-modulated refractive index that can be altered locally with a write pulse. Therefore it is conceivable and within the scope of the invention to implement any other material with these properties, regardless of whether or not the material was produced by holographic means. Other, non-holographic methods for creating a bulk recording medium with a periodic, spatially-modulated refractive index could also be used. In addition, other holographic techniques may be used to write the format hologram. For example, the format hologram may be an elementary phase reflection hologram (i.e. a hologram written with two plane waves) although other types of format hologram structures are suitable as well.

Figure 5A:
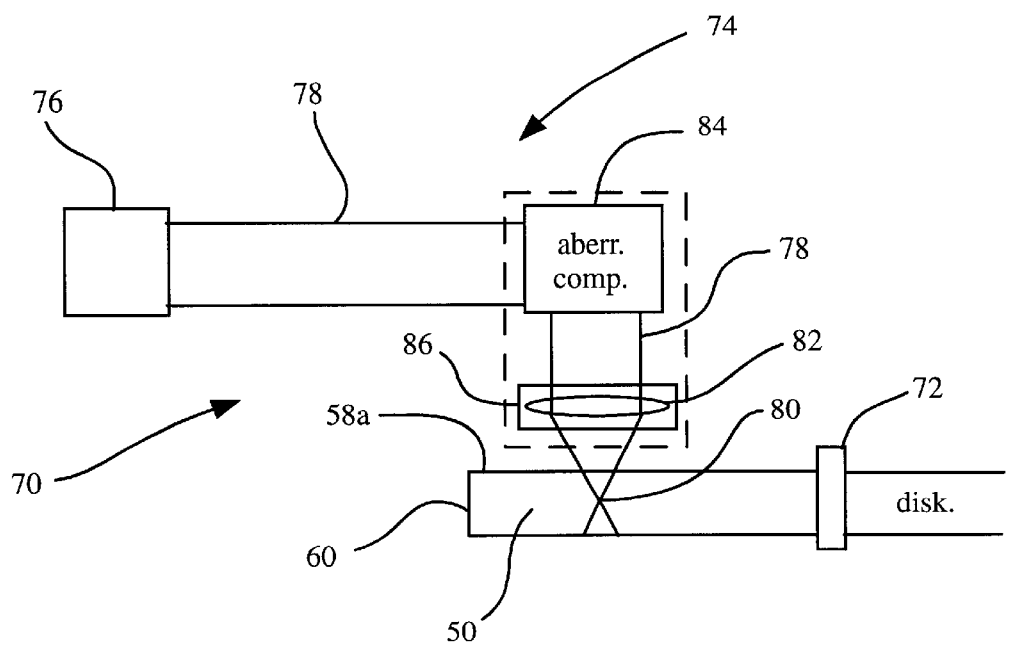
FIG. 5A is a schematic drawing of an optical data recording system in accordance with a preferred embodiment of the present invention.

In another preferred embodiment of the present invention, a schematic drawing of an optical data storage system 70 is shown in FIG. 5A. The optical storage device 60 is disk-shaped and mounted on a rotary platform 72. The platform 72 continuously rotates the storage device 60 under a recording head 74 at a high angular velocity about an axis parallel with the depth axis. Light source 76 generates a write beam 78, which can be focused at desired storage locations 80 within the optical data storage medium 50 using tunable optics housed within the recording head 74. The storage medium 50, in accordance with the presently preferred embodiment of the present invention, will be formed from a photopolymer having molecules exhibiting non-linear absorption dissolved throughout the photopolymer. The optics of the recording head 74 include a high numerical aperture objective lens 82 and a dynamic aberration compensator 84. Objective lens 82 generally has a numerical aperture in the range of, e.g, 0.4 to 0.65 or higher. Higher numerical apertures translate into shorter depths of field and smaller spot sizes at the beam focus, which, in turn, translate into greater recording density. The lens 82 is mounted on a multiple-axis actuator 86, such as a voice-coil motor, which controls the focusing and fine-tracking of the lens 82 relative to the medium 50.

When focused at a depth within the bulk recording medium 50, the write beam 78 will generally experience spherical aberration as it focusses to a location inside a medium of an index of refraction substantially different than the ambient index, such as air. The degree of these aberration effects will depend on the numerical aperture of the beam and depth accessed by the beam. Spherical aberration causes undesirable blurring of the beam at its focus, but it can be corrected using an aberration compensator 84. Any appropriate aberration compensator may be used and a description of the aberration compensator is omitted from this disclosure in order to avoid overcomplicating the disclosure. For a more detailed discussion of an appropriate aberration compensator see, for example, copending U.S. patent application Ser. No. 09/016,382 filed on Jan. 30, 1998, in the name of inventor Hesselink et al., entitled "Optical Data Storage by Selective Localized Alteration of a Format Hologram and/or retrieval by Selective Alteration of a Holographic Storage Medium." See also U.S. Pat. No. 5,202,875, issued Apr. 13, 1993 to Rosen et. al., entitled "Multiple Date Surface Optical Data Storage System" and U.S. Pat. No. 5,157,555, issued Oct. 20, 1992, to Reno, entitled "Apparatus for Adjustable Correction of Spherical Aberration," which are hereby expressly incorporated by reference as if set forth fully herein.

Figure 6:
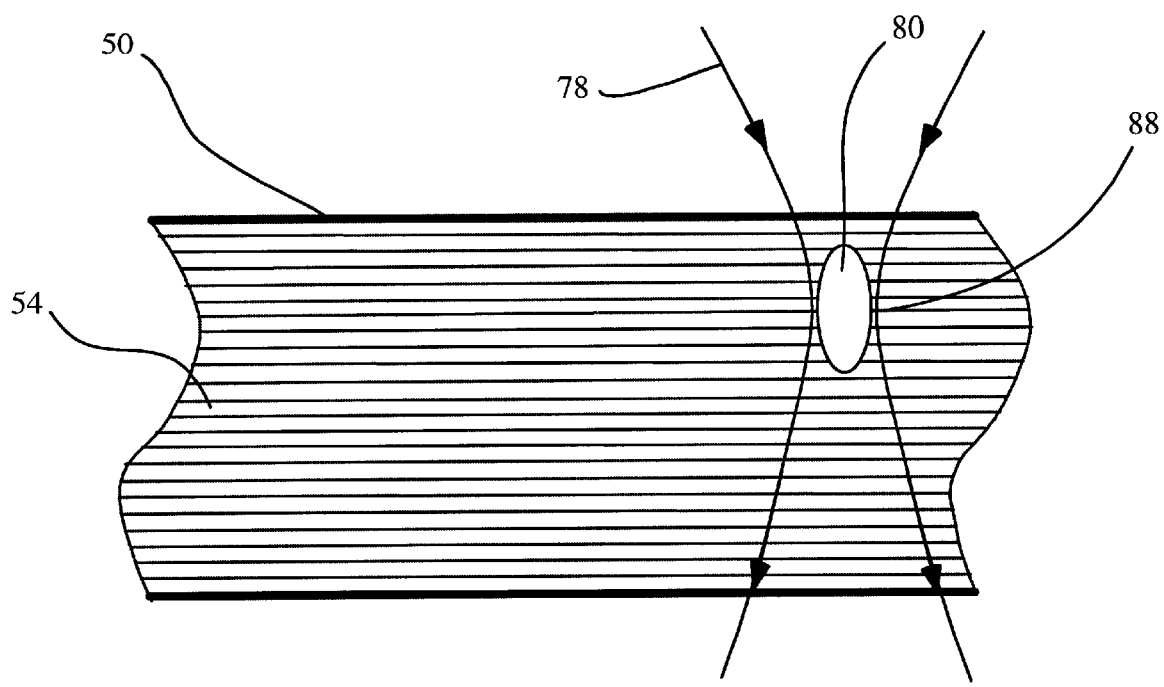
FIG. 6 is a schematic drawing of a method for writing data onto a storage location within an optical data storage medium, according to a presently preferred embodiment of the present invention.

The writing procedure is illustrated schematically in FIG. 6. In order to record a bit of data, the write beam 78 is focused at a desired storage region 80 within the medium 50. The medium, in accordance with the presently preferred embodiment of the present invention, will be formed from a photopolymer having molecules exhibiting non-linear absorption dissolved within the photopolymer. In general, there is no requirement that the write beam 78 have the same frequency as a retrieval beam used later to read the data. As will be apparent to those of ordinary skill in the art, the storage locations 80 be arranged in a variety of ways throughout the volume of recording medium 50. They may be arranged, for example, in a 3-dimensional lattice, rectangular or otherwise, so that data can be stored on multiple layers at various depths within the medium 50.

The write beam 78 causes local heating of the medium 50, which creates a local alteration 88. Local alteration 88 may be a local expansion or contraction of the medium 50. If the heating is substantial, the distortion is inelastic, and the local alteration 88 remains after the write beam 78 is switched off. The local expansion or contraction alters the spacing of the Bragg fringes 54 and generally results in a change of the mean index of refraction. Generally, a small expansion of the material, for example, results in a lower density, and therefore a decrease in the mean index of refraction. Changes in the mean index of refraction may also arise due to chemical and structural changes in the material. Therefore, although the "optical fringe spacing" parameter nd can increase due to material expansion it can also decrease due to a decrease in the index of refraction. In the cationic ring-opening photopolymer, of the present invention, the "optical fringe spacing", nd, generally, decreases after illumination. If the "optical fringe spacing" parameter nd is altered, then a second Bragg reflection condition is defined, local to the alteration 88, and distinct from the first Bragg reflection condition of the unaltered bulk medium 50. In particular, the alteration 88 will have reflectivity properties that are different from those of the unaltered bulk medium 50.

Figure 5B:
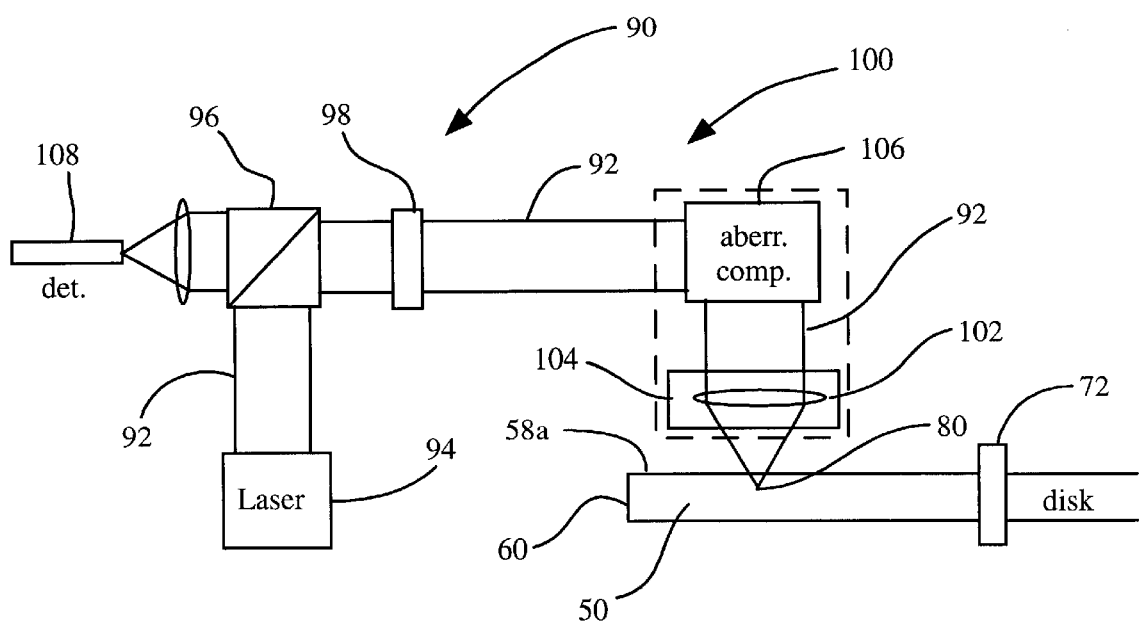
FIG. 5B is a schematic drawing of an optical data retrieval system in accordance with a preferred embodiment of the present invention.

In yet another presently preferred embodiment of the present invention a data retrieval system 90 is illustrated in FIG. 5B. A retrieval beam 92 is produced by a source 94 and passed through a polarizing beam-splitter 96 and a quarter-wave plate 98. Polarizing beam-splitters and quarter-wave plates are preferably used instead of simple beam-splitters for reducing losses at the separation elements and to suppress feedback to the laser. As with the recording beam 78, the retrieval beam 92 is focused with a retrieval head 100 including a high numerical aperture lens 102 mounted on a multiple-axis servo-motor 104 and an aberration compensator 106.

Light reflected from the medium 50 is measured with detector 108. In a presently-preferred embodiment of the invention, detector 108 is a confocal, depth-selective detector that includes spatial filtering optics that permit it to detect light Bragg-reflected from only those storage locations 80 at desired depths within the medium 50. Spatial filtering optics are well-known to those of ordinary skill in the art.

Figure 5C:
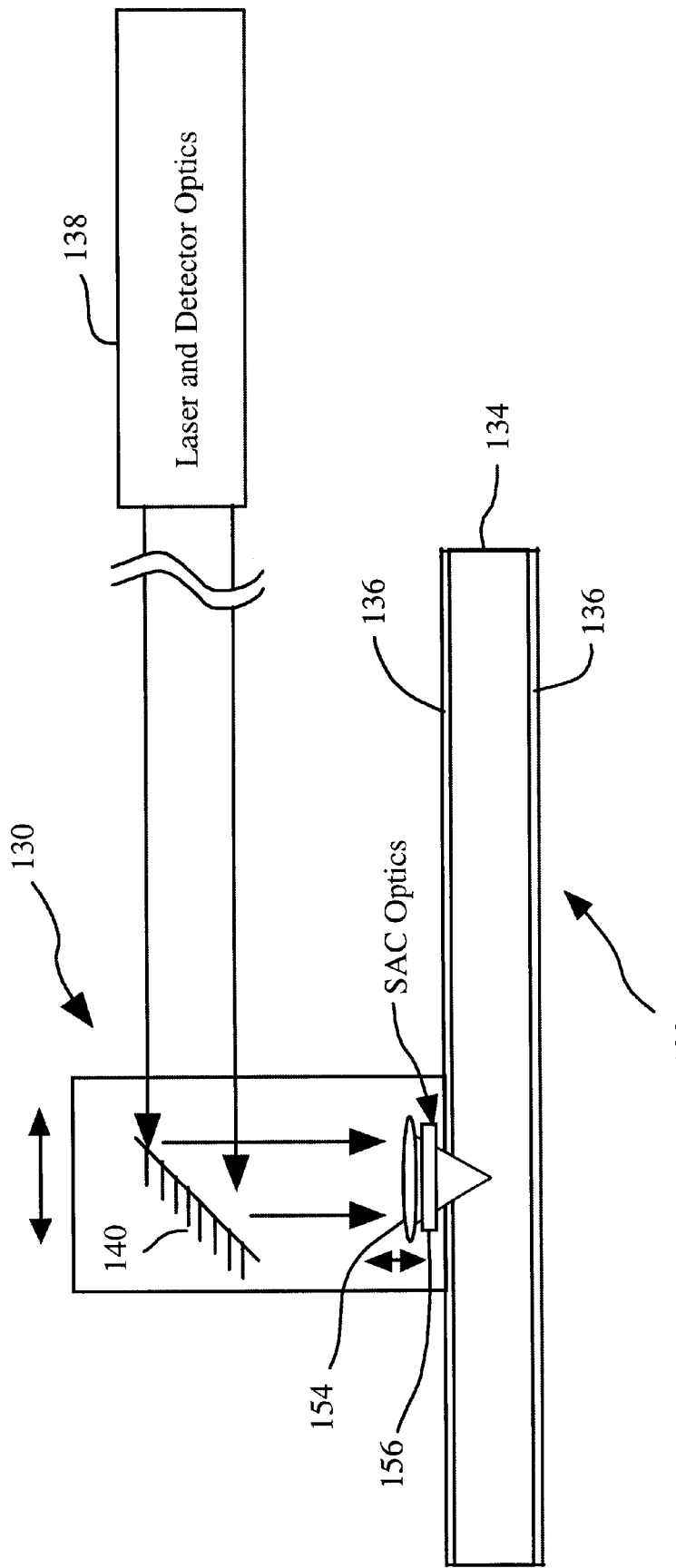
FIG. 5C is a schematic drawing of an optical data recording and/or retrieval system in accordance with another preferred embodiment of the present invention.

Referring to FIG. 5C, there is shown an embodiment of the present invention in which an optical head 130 is positioned to access a storage device 132 comprising a photopolymer 134, which further comprises a format hologram. The photopolymer medium 134 may be generally disposed between two cover layers 136 (e.g. glass) for stability and protection from the environment. Optical head 130 is used for both reading from and writing to the medium 134. The output of optical head 130 is optically coupled to laser and detector optics 138 using reflecting surface 140. An objective lens 154 in optical head 330 focuses the access beam onto the medium. A dynamic spherical aberration corrector (SAC) 156 is optionally present in the path of the beam to correct for variations in spherical aberration that arise as different depths are accessed in the medium 134. Depending on the type of spherical aberration corrector used, it may be located before or after the objective lens 154.

Figure 5D:
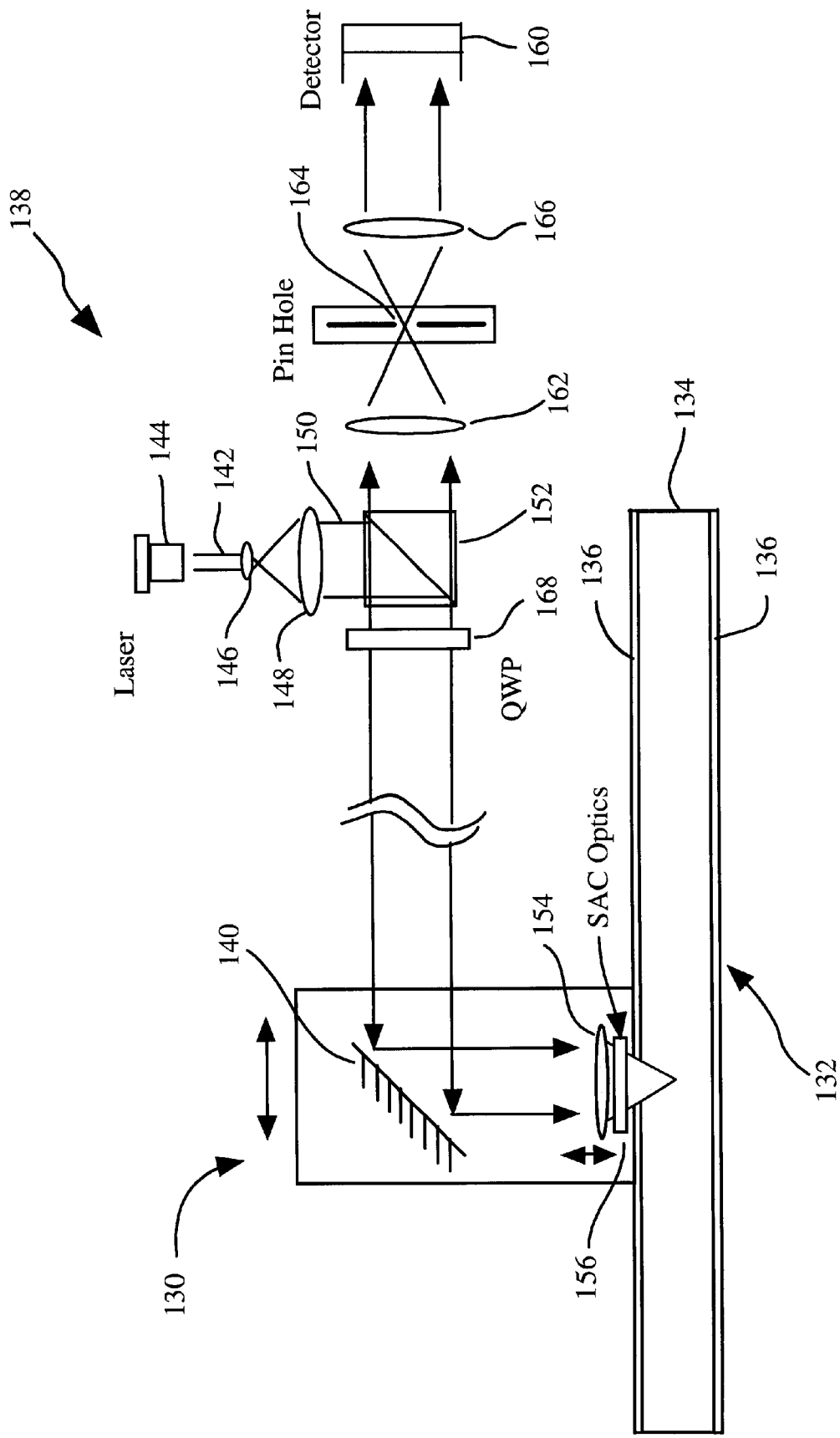
FIG. 5D is a schematic drawing of an optical recording and/or retrieval system in accordance with yet another preferred embodiment of the present invention.

Referring next to FIG. 5D, there is shown another embodiment of the present invention, with like reference numbers denoting like parts, in which laser and detector optics 138 include a confocal detector to discriminate light reflected from a desired layer. Laser illumination 142 from laser 144 for the access beam is expanded and directed toward the medium 134 by lenses 146 and 148. The expanded beam 150 passes through a beam splitter 152, which is present to couple the incident beam into the access path. The output of optical head 130 is optically coupled to laser 144 and detector optics 138 using reflecting surface 140. The objective lens 154 in optical head 130 focuses the access beam onto the medium. A dynamic spherical aberration corrector (SAC) 156 is optionally present in the path of the beam to correct for variations in spherical aberration that arise as different depths are accessed in the medium 134. Depending on the type of spherical aberration corrector used, it may be located before or after the objective lens 154. Light is focussed with a numerical aperture in the range of, e.g., 0.4 to 0.65 or higher. Thus, for visible wavelengths, spot sizes used to access data are on the order of about 1 $\mu$m or smaller.

Light is reflected from the accessed point in the medium 134. Reflected light is returned through spherical aberration corrector 156 and the objective lens 154. Reflected light passes through the beam splitter 152 towards the detector 160. A first lens 162 focuses the light to a point of focus. A pinhole 164 is situated to admit the focused light corresponding to the accessed layer; a pinhole situated in this manner is a well-known basis for confocal detection. A second lens 166 collimates the light, which is then detected by detector 160. An optional quarter wave plate 168 inserted between a polarizing beam splitter and the material will cause substantially all of the returning light to be deflected to the detector 160. In the case of a rotatable media such as a disk, rotation brings different regions of the medium into the range accessible to the optical head. The head is adjusted to position the focussed beam radially to access different tracks in the radial direction and in depth to access different data layers, by use of well-known positioning techniques.

Figure 7A:
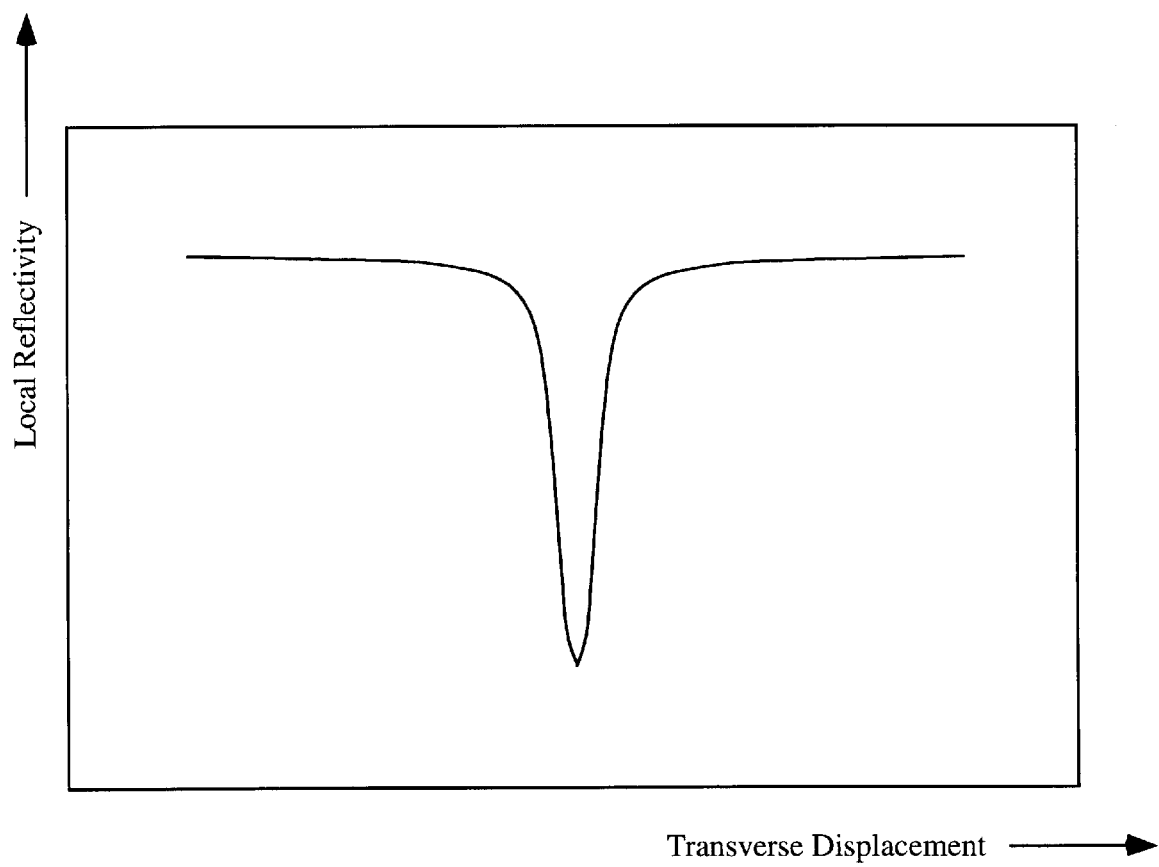
FIG. 7A is a graphic illustration showing the reflectivity profile of a negative bit along a circumferential direction at a constant depth, in accordance with a preferred embodiment of the present invention.

Readout of the recorded information can be measured in at least two complementary ways. Referring again to FIG. 5A, if the retrieval beam 92 is tuned to the Bragg reflection condition of the bulk medium 50, then the alteration 88 will be dark relative to the unaltered bulk medium 50. If the bulk medium 50 is spinning rapidly beneath the retrieval head 100, then the alteration 88 will appear to the detector 108 as a "negative bit",or a momentary drop in intensity, as shown in FIG. 7A.

Figure 7B:
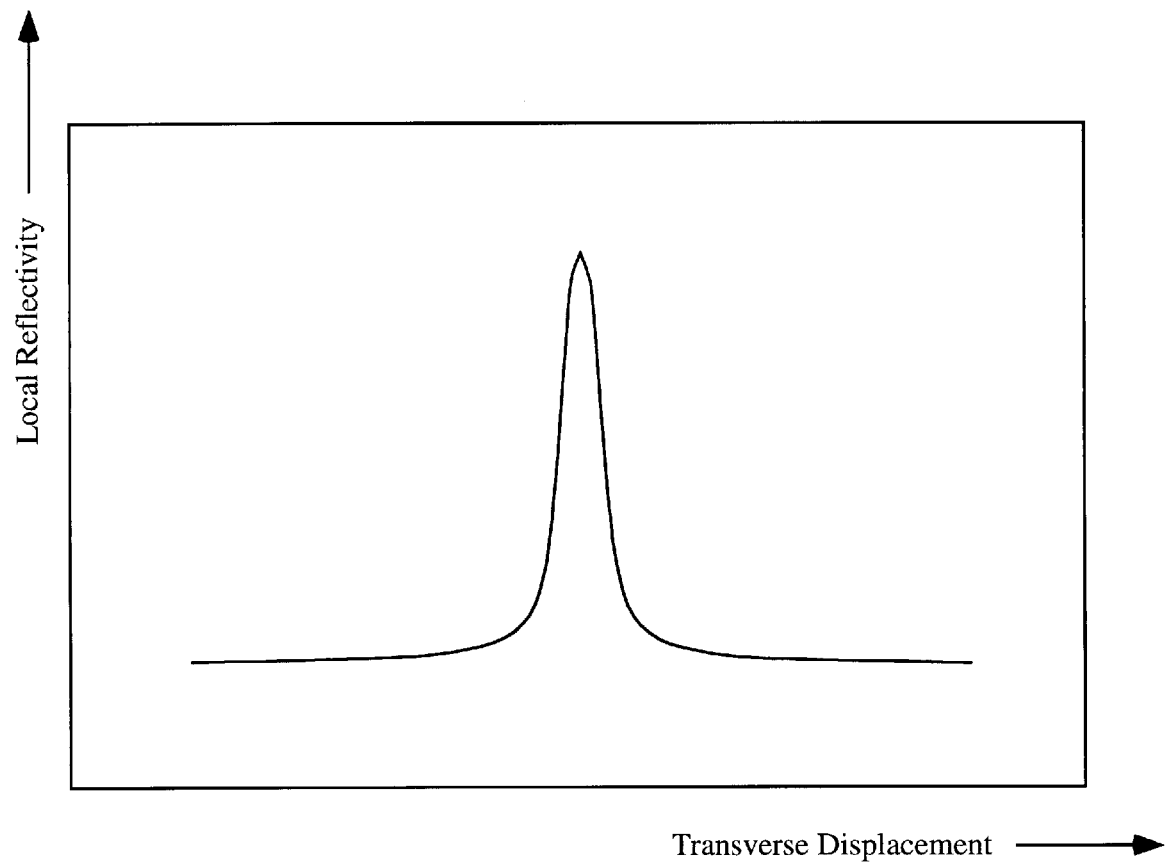
FIG. 7B is a graphic illustration showing reflectivity vs. In-plane coordinate indicating a positive bit in accordance with a preferred embodiment of the present invention.

It is possible to select the wavelength of the retrieval beam and the fringe spacing during the formatting step so that the retrieval beam 92 is tuned to a second Bragg reflection condition—that of the alterations 88. If this is done, then the alterations 88 will appear bright relative to the unaltered bulk medium 50, and for a moving medium will register at the detector 108 as a "positive bit",or momentary increase in intensity, as shown in FIG. 7B.

The latter, "positive bit" approach offers the advantage of a higher signal-to-noise ratio than the former "negative bit" approach, since it is easier to detect a positive flash of light against a background of darkness, than a momentary period of darkness against a background of light. However, the "negative bit" approach might be preferred in some embodiments, if, for example, it is desirable to tune the retrieval beam to the bulk medium 50 rather than to the alterations 88, e.g. to take advantage of complex hologram structures defining layers, as described in copending U.S. patent application Ser. No. 09/016,382 filed on Jan. 30, 1998, in the name of inventor Hesselink et al., entitled "Optical Data Storage by Selective Localized Alteration of a Format Hologram and/or retrieval by Selective Alteration of a Holographic Storage Medium".

Alternative Embodiments

Although illustrative presently preferred embodiments and applications of this invention are shown and described herein, many variations and modifications are possible which remain within the concept, scope and spirit of the invention, and these variations would become clear to those skilled in the art after perusal of this application. The invention, therefore, is not limited except in spirit of the appended claims.

What is claimed is:

1. An optical data storage medium comprising:

a photopolymer including:
   a photo-acid generator which produces an acid upon exposure to actinic radiation;
   an active binder;
   at least one cationic ring opening monomer which undergoes polymerization when exposed to said acid; and
   non-linear absorbing molecules dissolved homogeneously throughout said photopolymer, said nonlinear absorbing molecules comprising fullerene as a reverse saturable absorber.

2. A method for optical data storage, comprising:

(a) providing a photopolymer including a photoacid generator which generates an acid upon exposure to actinic radiation, an active binder, at least one cationic ring opening monomer which undergoes cationic polymerization when exposed to said acid, and non-linear absorbing molecules homogeneously dissolved throughout said photopolymer;

(b) recording a format hologram in said photopolymer; and (c) locally heating said photopolymer, said heating associated with non-linear light absorption by said nonlinear absorbing molecules, said heating locally altering said format hologram.

3. The optical data storage method of claim 2, wherein said heating is associated with a two-photon absorption by said non-linear absorbing molecules.

4. The optical data storage method of claim 2, wherein said heating is associated with a reverse saturable absorption by said non-linear absorbing molecules.

5. The optical data storage method of claim 2, wherein said non-linear absorbing molecules in said photopolymer comprise a chromophore exhibiting two-photon absorption.

6. The optical data storage method of claim 5, wherein said chromophore exhibiting two-photon absorption comprises a symmetrically substituted conjugated organic molecule from the class consisting of donor-pi-donors, donor-acceptor donors, acceptor-pi-acceptors, and acceptor-donor-acceptors.

7. The optical data storage method of claim 2, wherein said non-linear absorbing molecules comprise a reverse saturable absorber.

8. The optical data storage method of claim 7, wherein said reverse saturable absorber is selected from the group consisting of phthalocyanines, naphthalocyanines and porphyrins.

9. The optical data storage method of claim 2, wherein said non-linear absorbing molecules have a concentration, in said photopolymer, of between about 0.1 mol/liter and the solubility limit of said non-linear absorbing molecules.

10. The optical data storage method of claim 2, wherein said photopolymer further comprises a sensitizer for recording said format hologram.

* * * * *